United States Patent [19]

Strangman et al.

[11] Patent Number: 4,743,514
[45] Date of Patent: May 10, 1988

[54] OXIDATION RESISTANT PROTECTIVE COATING SYSTEM FOR GAS TURBINE COMPONENTS, AND PROCESS FOR PREPARATION OF COATED COMPONENTS

[75] Inventors: Thomas E. Strangman, Phoenix; Steven J. Vonk, Scottsdale, both of Ariz.

[73] Assignee: Allied-Signal Inc., Los Angeles, Calif.

[21] Appl. No.: 509,284

[22] Filed: Jun. 29, 1983

[51] Int. Cl.⁴ .................. B05D 1/08; B32B 15/00; C22C 19/05
[52] U.S. Cl. .................... 428/678; 420/443; 420/445; 420/588; 427/34; 428/656; 428/680
[58] Field of Search .............. 427/34; 428/656, 678, 428/680; 420/443, 445, 588

[56] References Cited

U.S. PATENT DOCUMENTS

| | | |
|---|---|---|
| 3,338,733 | 8/1967 | Rowady . |
| 3,594,219 | 7/1971 | Maxwell et al. . |
| 3,649,225 | 3/1972 | Simmons, Jr. . |
| 3,779,719 | 12/1973 | Clark et al. . |
| 3,869,779 | 3/1975 | Gedwill et al. . |
| 3,904,382 | 9/1975 | Beltran et al. . |
| 3,907,611 | 9/1975 | Sasame et al. . |
| 3,918,139 | 11/1975 | Felten . |
| 3,961,098 | 6/1976 | Bessen . |
| 4,005,989 | 2/1977 | Preston . |
| 4,013,424 | 3/1977 | Wildgoose et al. ............... 420/445 |
| 4,029,477 | 6/1977 | Grisik . |
| 4,054,723 | 10/1977 | Higginbotham et al. . |
| 4,086,391 | 4/1978 | Giggins, Jr. et al. . |
| 4,094,673 | 6/1978 | Erickson et al. ................ 420/445 |
| 4,101,713 | 7/1978 | Hirsch et al. . |
| 4,101,715 | 7/1978 | Rairden, III . |
| 4,152,488 | 5/1979 | Schilke et al. . |
| 4,246,323 | 1/1981 | Bornstein et al. . |
| 4,339,509 | 7/1982 | Dardi et al. . |
| 4,419,416 | 12/1983 | Gupta et al. .................. 428/656 |
| 4,447,503 | 5/1984 | Dardi .......................... 428/656 X |

*Primary Examiner*—Richard D. Lovering
*Attorney, Agent, or Firm*—R. Steven Linne; James W. McFarland

[57] ABSTRACT

A coating for protecting the surfaces of gas turbine components such as single crystal turbine blades and vanes, wherein the coating has a composition (in weight percent) consisting essentially of chromium, 15-35; aluminum, 8-20; tantalum, 0-10; tantalum plus niobium, 0-10; silicon, 0.1-1.5; hafnium, 0.1-1.5; yttrium, 0-1; cobalt, 0-10; and nickel, balance totalling 100 percent. A preferred coating, which is particularly desirable for use with single-crystal turbine blades and vanes, has a composition consisting essentially of chromium, 17-23; aluminum, 10-13; tantalum plus niobium, 3-8; silicon, 0.1-1.5; hafnium, 0.1-1.5; yttrium, 0-0.8; cobalt, 0-trace; and nickel, balance totalling 100 percent. A process for preparing the coated component is also described.

22 Claims, 2 Drawing Sheets

- OXIDE SCALE
- SCC 103 COATING
- DIFFUSION AFFECTED SUBSTRATE
- UNAFFECTED CMSX-3 SUBSTRATE

OXIDATION RESISTANT PROTECTIVE COATING SYSTEM FOR GAS TURBINE COMPONENTS, AND PROCESS FOR PREPARATION OF COATED COMPONENTS

BACKGROUND OF THE INVENTION

This invention relates generally to alloys for use at high temperatures, and more particularly to oxidation-resistant coatings for protecting gas turbine components.

Gas turbine engines, commonly known as "jet engines" when used for propulsion, generate power by drawing in and compressing air, mixing the air with fuel, burning the mixture to create combustion gas, and then expelling the gas outwardly through a turbine. The turbine functions by turning the direction of the combustion gas flow slightly away from an axial path with stationary turbine vane components, and the turned gas flow then impinges upon a series of turbine blade components, which are attached to a rotating turbine wheel. The force of the gas against the turbine blades causes the turbine wheel to turn rapidly. Turbine efficiency increases with increasing nominal operating temperature, but the ability of the turbine to operate at increasingly great temperatures is limited by the ability of the turbine vanes and blades to withstand the heat, oxidation and corrosion effects of the impinging hot gas stream and still maintain sufficient mechanical strength. Thus, there exists a continuing need to find material systems for use in components that will function satisfactorily in gas turbines at higher temperatures and stresses.

One approach to providing improved turbine components is to fabricate a strong, stable substrate having the shape of the component, and cover the substrate with a thin protective coating that resists the oxidation and corrosion effects of the hot combustion gas stream. The underlying substrates, usually nickel-base or cobalt-base superalloy compositions, were formed by forging or simple casting procedures at one time, but improved performance results from use of directional solidification or directional recrystallization procedures. Even greater operating temperatures are possible by casting the substrate as a single crystal having no grain boundaries which might cause premature failure, and with the single crystal oriented for best performance at the operating temperature.

A coating of about 0.001–0.010 inches thickness is usually applied to protect the substrate, through formation of an adherent oxide such as aluminum oxide that resists the oxidizing effects of the hot combustion gas stream. Other elements present in the coating resist hot salt corrosion and contribute to the ability of the protective oxide scale coating to adhere to the coating through many cycles of gas turbine startup and shutdown.

As nominal gas turbine operating temperatures are raised through development of improved substrate materials, it is critical that the performance of the coating and the substrate be optimized to achieve the greatest overall performance. Single crystal superalloy components are particularly attractive for use at high turbine temperatures, but to achieve improved high temperature performance the single crystal substrate chemical compositions have been modified in several subtle but important ways. As a result of these modifications, the coatings used in previous component protective systems do not provide the optimum performance when used with substrates cast as single crystals.

There therefore exists a need for an improved coating to be used to protect turbine components. In particular, there is a need for an improved coating which contributes to the optimization of performance of single crystal superalloy turbine blades and vanes, but can also be used with polycrystalline components. The present invention fulfills this need and further provides related advantages.

SUMMARY OF THE INVENTION

The present invention provides an oxidation-resistant coating system for protection of superalloy gas turbine components, and a process for preparing protected components. The chemistry of the coating is modified from that of prior coatings to increase the adherence of the protective oxide scale and to increase the strength and diffusional stability of the coating, while maintaining adequate resistance to corrosion by ingested salts. With this invention, the coating and substrate material system may be optimized to provide increased performance and operating life of the gas turbine.

In accordance with the invention, a coating for protecting superalloy turbine components consists essentially of ingredients in substantially the following ranges:

| | |
|---|---|
| chromium | 15–35 |
| aluminum | 8–20 |
| tantalum | 0–10 |
| tantalum + niobium | 0–10 |
| silicon | 0.1–1.5 |
| hafnium | 0.1–1.5 |
| yttrium | 0–1 |
| cobalt | 0–10 |
| nickel | balance totalling 100 percent |

(All percentages herein are in weight percent.) More preferably, a coating for protecting nickel-based superalloy turbine blades and vanes such as single-crystal components consists essentially of ingredients in about the following amounts and ranges:

| | |
|---|---|
| chromium | 17–23 |
| aluminum | 10–13 |
| tantalum + niobium | 3–8 |
| silicon | 0.1–1.5 |
| hafnium | 0.1–1.5 |
| yttrium | 0–0.8 |
| cobalt | 0–trace |
| nickel | balance totalling 100 percent |

Even more preferably, a coating for protecting nickel-based superalloy turbine vanes and blades such as single crystal components consists essentially of ingredients in about the following amounts:

| | |
|---|---|
| chromium | 20 |
| aluminum | 11 |
| tantalum + niobium | 7 |
| silicon | 0.1–1.5 |
| hafnium | 0.1–1.5 |
| yttrium | 0–0.8 |
| cobalt | 0–trace |
| nickel | balance totalling 100 percent |

Most preferably, a coating for protecting nickel-based superalloy turbine blades and vanes such as single crystal components consists essentially of ingredients in about the following amounts:

| | |
|---|---|
| chromium | 20 |
| aluminum | 11 |
| tantalum | 7 |
| niobium | 0-trace |
| hafnium | 1 |
| silicon | 1 |
| yttrium | 0-trace |
| cobalt | 0-trace |
| nickel | balance totalling 100 percent |

The coatings of the present invention may be applied to the substrates by any convenient means which minimizes oxidation or other degradation of the coating during application. Preferably the coating is applied as an overlay having all of the necessary elements present in the coating, rather than as a diffusional coating. Any clean technique for applying overlay coatings can be utilized, such as plasma spraying, electron beam physical vapor deposition and sputtering.

It will be appreciated from the foregoing that the present invention represents a significant advance in gas turbine technology, by providing an optimized protective coating for use with components such as single-crystals. Other features and advantages will become apparent from the following more detailed description, taken in conjunction with the accompanying drawings and photomicrographs, which illustrate, by way of example, the principles of the invention.

BRIEF DESCRIPTION OF THE DRAWINGS

The accompanying drawings and photomicrographs illustrate aspects of an embodiment of the invention. In such drawings.

DETAILED DESCRIPTION OF THE PREFERRED EMBODIMENT

Figure 1:
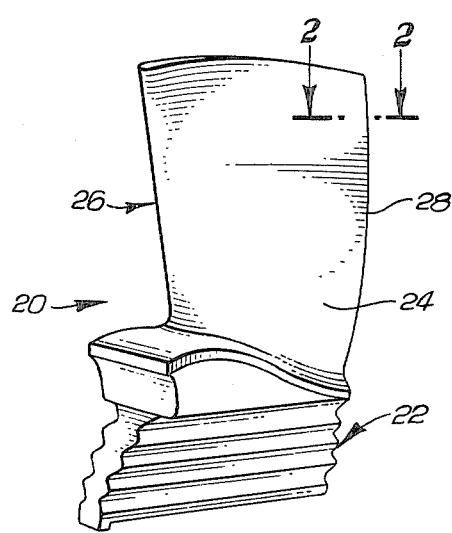
FIG. 1 is a perspective view of a turbine blade.

As is shown in the drawings and photomicrographs for the purposes of illustration, the present invention is embodied in a coating and process for protecting gas turbine components such as turbine blades and vanes from oxidative and corrosive attack in a high temperature environment. FIG. 1 shows an air cooled turbine blade 20 as an example of a coated gas turbine component. The blade includes a root section 22 for attaching to the turbine wheel and an airfoil 24 upon which a hot gas stream impinges.

Figure 2:
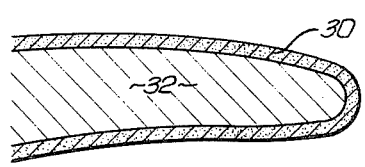
FIG. 2 is an enlarged fragmented sectional view of a trailing edge of the turbine blade of FIG. 1, taken generally along line 2—2, illustrating a coating applied to the surface of a substrate.
Figure 3:
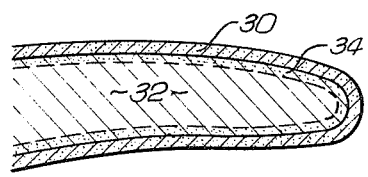
FIG. 3 is an enlarged fragmented schematic sectional view generally corresponding to that of FIG. 2, except after a period of high temperature exposure.

The airfoil 24 has a thicker leading edge 26 and tapers to a thinner trailing edge 28. FIG. 2 shows a sectional view of the trailing edge 28 after a coating 30 has been applied to protect the underlying blade substrate 32. A corresponding view, FIG. 3, shows the trailing edge 28 after the turbine blade 20 has been exposed to elevated temperature. During elevated temperature exposure the coating 30 and the underlying substrate 32 diffusionally and chemically interact to produce a diffusion affected substrate zone 34, which is undesirable but is an inevitable result of diffusion at elevated temperature. The diffusion affected substrate zone 34 is of lower strength than the underlying substrate 32, and consequently the presence of a diffusion affected substrate zone 34 weakens the airfoil 24. The diffusion affected substrate zone 34 may be only several thousandths of an inch thick, and the relative weakening is insubstantial in the thicker portions of the airfoil 24. However, in the thinner portions of the airfoil 24 such as the trailing edge 28 where the airfoil 24 itself is thin, the relative weakening due to a diffusion affected substrate zone 34 significantly weakens the airfoil 24. Some turbine components are hollow with cooling passages, and a diffusion affected substrate zone similarly may have a significant weakening effect on such components, particularly in the thin section overlying a cooling passage. Thus, minimizing the thickness of diffusion affected substrate zones is important to the improvement of all types of turbine components.

The underlying substrates (e.g., substrate 32) of metallic gas turbine components are usually made from nickel-base or cobalt-base superalloys, which have various alloying ingredients added to impart high temperature strength and creep resistance. Early in the development of gas turbines, relatively low temperature components were fabricated by forging or ordinary casting procedures, which left them with a polycrystalline grain structure. One technique for improving component performance is control of the grain structure, to lessen the impact of intergranular failure mechanisms. Directional solidification and directional recrystallization produce blades and vanes generally with fewer grains than conventionally cast substrates, and with the intergranular boundaries aligned parallel to the major stress axis to eliminate transverse intergranular failure paths.

Advanced casting techniques now allow the fabrication of single crystal substrates which are functional to higher operating temperatures. The higher temperatures increase the severity of oxidation attack and also increase diffusion rates which promote diffusional interactions of the coating and substrate. On the other hand, at such higher temperatures corrosive attack by condensed molten salt films is typically reduced somewhat from the attack experienced at lower operating temperatures, since the most damaging sulfates reside on the component surfaces only up to about 1700°–1800° F. but are vaporized rapidly at higher operating temperatures. The coating must also resist the effect of repeated thermal cycling of the component, since an aircraft gas turbine component operates through temperature and loading cycles. In an operating cycle, the engine starts cold, is warmed up briefly, and then is subjected to high temperature and force loadings during takeoff. Flight maneuvers require changes in power and consequently variations in engine temperature, and at the end of the flight the engine is throttled back and then turned off. The coatings protecting the turbine components must retain their structural integrity and adherence throughout multiple engine cycles before inspection, replacement or repair.

Coatings typically protect the turbine components with an oxide scale which forms rapidly at the coating surface and then inhibits further attack. Pieces of the oxide scale may be lost during the operation of the components by a fracturing process called spalling, and elements in the coating diffuse to the damaged spot so that a new oxide surface layer is rapidly formed to inhibit further damage. In this sense the coating contains a distributed reservoir of scale-forming elements which are available for self-repair of damaged portions. Alloying elements in the coating are also present to impart corrosion resistance and to improve the ability of the scale to adhere to the coating. While the various alloying additions have beneficial effects, they may also have detrimental effects in that they promote metallurgical changes in the underlying substrate after diffusing from the coating into the substrate.

Coatings may be applied as overlay coatings or diffusion coatings. An overlay coating contains all of the protective alloying elements necessary in the initially deposited layer, while by contrast a diffusion coating requires interdiffusion of the substrate and the initially deposited coating materials to provide the necessary protection.

A coating for protecting superalloy gas turbine components prepared in accordance with the present invention consists essentially of alloying ingredients in about the following amounts and ranges:

| chromium | 15–35 |
| aluminum | 8–20 |
| tantalum | 0–10 |
| tantalum + niobium | 0–10 |
| silicon | 0.1–1.5 |
| hafnium | 0.1–1.5 |
| yttrium | 0–1 |
| cobalt | 0–10 |
| nickel | balance totalling 100 percent |

More preferably, a coating that is particularly suitable for protecting single crystal nickel-base superalloy turbine blades and vanes consists essentially of ingredients in about the following amounts and ranges:

| chromium | 17–23 |
| aluminum | 10–13 |
| tantalum + niobium | 3–8 |
| silicon | 0.1–1.5 |
| hafnium | 0.1–1.5 |
| yttrium | 0–0.8 |
| cobalt | 0-trace |
| nickel | balance totalling 100 percent |

Even more preferably, a coating for protecting single-crystal nickel based supperalloy turbine vanes and blades consists essentially of ingredients in about the following amounts:

| chromium | 20 |
| aluminum | 11 |
| tantalum + niobium | 7 |
| silicon | 0.1–1.5 |
| hafnium | 0.1–1.5 |
| yttrium | 0–0.8 |

-continued

| cobalt | 0-trace |
| nickel | balance totalling 100 percent |

Most preferably, a coating for protecting single crystal nickel-base superalloy turbine blades and vanes consists essentially of alloying elements in about the following amounts:

| chromium | 20 |
| aluminum | 11 |
| tantalum | 7 |
| niobium | 0-trace |
| hafnium | 1 |
| silicon | 1 |
| yttrium | 0-trace |
| cobalt | 0-trace |
| nickel | balance totalling 100 percent |

It is understood that the ingredients, the the various coatings prepared in accordance with the invention, may not be present in the coating in elemental form, but instead may be present as solid solutions of precipitated or combined phases. The terminology "0-trace" is used herein to indicate that a very low level of that ingredient is desired. Preferably, none is present, but minor amounts such as found essentially as impurities or very minor additions are tolerated.

Coatings of the above-identified compositions are preferably applied to the surface of turbine components as overlay coatings, by any of such techniques known in the art. Plasma spraying of the coating is presently preferred, but electron beam physical vapor deposition, sputtering, and other techniques may also be utilized. The ingredients may be supplied for application in any form appropriate to the particular method chosen. For example, prealloyed powders of the proper compositions may be furnished for plasma spraying.

Although the coatings are preferably applied as overlays not requiring diffusion of elements from the substrate, it is recognized that interdiffusion of elements from the coating into the substrate, and of the elements from the substrate into the coating in minor amounts, may occur at the elevated temperatures of operation. The coatings protect the substrates even after extended exposures at elevated temperatures, as demonstrated in 500 hour burner rig tests at 2100° F., as described below. It is therefore believed that a minor amount of interdiffusion of elements between the substrate and the coating during elevated temperature exposure does not itself compromise the ability of the coating to protect the substrate from oxidation in normal usage.

Alloying elements such as hafnium and zirconium, which enhance oxide scale adhesion of coatings are present in polycrystalline superalloy substrates to strengthen the substrate grain boundaries, but can be detrimental to heat treating procedures in single crystal substrates if their concentrations are maintained at levels typical of polycrystalline superalloys. Their levels are therefore reduced in alloys used to prepare single-crystal substrates. Hafnium,, yttrium and silicon are added to the present coating compositions, to promote oxide scale adhesion, at levels greater than normally found in coatings for polycrystalline superalloy substrates.

With coatings of the present invention having higher contents of the oxide scale adhesion-promoting elements, levels of elements such as hafnium and zirconium may be considerably reduced in the substrate alloy to facilitate solution heat treating, but their presence in the coating promotes the retention of the protective oxide during thermal cycling. Minimum amounts of the oxide-scale adhesion-promoting elements are required in the coating to achieve threshold levels of effectiveness, as indicated in the above identified compositions. However, hafnium, silicon and yttrium are also melting point depressants in nickel-base alloys. Too high a level of such alloying elements may result in incipient melting of portions of the coating due to solute melting point depression, and upper limits of additions are therefore provided.

Tantalum or niobium additions in the coating strengthen the coating and can alter its thermal expansion coefficient to more nearly match that of the underlying substrate. During thermal cycling of the coated turbine component, if the thermal expansion coefficients of the substrate and coating are substantially different and the coating is weak, stresses and strains in the coating may cause it to bulge or buckle locally, producing ripples in the surface. Rippling locally thins the coating and increases the surface area to be protected. If the ripples become sufficiently severe, the protective oxide scale is damaged, and subsequent cracking and/or spallation significantly shortens coating life.

Tantalum and niobium strengthen the coating and modify its thermal expansion coefficient, and may be added to tailor the thermal expansion coefficient to that of a particular substrate alloy. No such additions need be made if the thermal expansion coefficient of the selected substrate alloy closely matches that of the coating. Additions greater than those indicated above may reduce the oxidation resistance of the coating. Tantalum is the preferred addition, but niobium exhibits a comparable effect on strength and thermal expansion. Molybdenum and tungsten additions could produce similar effects, but have undesirable side effects on hot corrosion and oxidation. In minor or trace amounts, however, such elements are not notably deleterious.

Cobalt is present in the coatings at a reduced level, preferably at a zero or trace level. Cobalt and chromium are normally present at higher levels in coatings at least in part to improve their hot-corrosion resistance in the presence of salts. However, cobalt also promotes the formation of a diffusion affected substrate zone, since cobalt increases the solubility of gamma prime precipitates in the gamma matrix. Thus, cobalt diffusing into the substrate from the coating tends to dissolve the gamma prime strengthening phase, thereby weakening the substrate. While such diffusional interactions may occur over distances of only a few thousandths of an inch, the degradation may be significant, as for example in the thin portions of the airfoils. While as much as about 10 percent cobalt may be tolerated without unacceptable effects on diffusional stability, desirably the coating contains at most trace amounts of cobalt.

The coatings of the invention retain adequate hot salt corrosion resistance by virtue of the remaining chromium. A single crystal turbine component operated at higher temperatures than polycrystalline components is expected to suffer less hot salt corrosion attack from ingested sea salt because the salts such as sulfates are volatile at temperatures above about 1700°–1800° F. Because the components do spend a portion of their life in the hot salt corrosion range, a reduced but sufficient amount of chromium is provided, with an indicated minimum threshold value. If the maximum chromium level is exceeded, further, but unneeded, hot salt corrosion protection is acquired at the expense of diffusional stability and oxidation resistance.

Aluminum, the basic ingredient in the coating for the formation of the oxidation inhibiting aluminum oxide scale, is provided in an intermediate range which may be adjusted to the specific application of the turbine component. Lower amounts of aluminum result in a more ductile coating for use in high strain turbine component applications. However, providing aluminum at a level below the indicated minimum risks loss of the basic function of the aluminum oxide protection, since sufficient aluminum to reform the oxide scale after spalling may not be available. Conversely, increasing amounts of aluminum render the coating less ductile and suitable only for low strain turbine component applications.

The following examples will serve to illustrate embodiments of the invention, but should not be interpreted as limiting the scope of the invention.

EXAMPLES

Test bars of coated superalloy substrate were prepared by plasma-spraying bars of CMSX-3 substrate alloy with coatings having the compositions shown in Table 1 and of thicknesses of about 0.002–0.003 inches. NiCrAlY is a previously known state-of-the-art coating used as a basis for comparison, and the SCC 101–106 coating materials are in accordance with the present invention. (The composition of CMSX-3 alloy, a known single crystal substrate alloy, is about 7.5 percent chromium, 7.5 tungsten, 6 percent tantalum, 5.5 percent aluminum, 4 percent cobalt, 0.9 percent titanium, 0.5 percent molybdenum, 0.1 percent hafnium, balance nickel.)

TABLE 1

| Coating Designation | Coating Composition wt %[1] | | | | | | |
|---|---|---|---|---|---|---|---|
| | Ni | Cr | Al | Ta | Hf | Si | Y |
| NiCrAlY | Bal. | 31 | 11 | — | — | — | 0.6 |
| SCC 101 | Bal. | 20 | 12 | — | 0.3 | 0.4 | 0.7 |
| SCC 102 | Bal. | 20 | 11 | 3.5 | 1.0 | 0.5 | — |
| SCC 103 | Bal. | 20 | 11 | 7.0 | 1.0 | 1.0 | — |
| SCC 104 | Bal. | 20 | 12 | — | 1.4 | — | — |
| SCC 105 | Bal. | 20 | 12 | — | 1.4 | 0.4 | — |
| SCC 106 | Bal. | 31 | 11 | — | 0.3 | 0.4 | 0.7 |

[1]Compositional ranges controlled to: ±1.0% for Co, Cr, Al; ±0.5% for Ta; ±0.2% for Hf, Si and Y Cyclic isothermal and multitemperature burner rig tests were conducted to evaluate the coated specimens under simulated gas turbine engine operating conditions. Cylindrical test specimens 2.375 inches long × 0.495 inches in diameter were rotated in front of a high velocity (about mach 0.3) flame of Jet A fuel at a rotational rate of 600–900 revolutions per minute. Cyclic isothermal burner rig tests, each of about 500 hours duration, utilized a test cycle of 57 minutes at 2100° F. followed by 3 minutes forced air cooling. The cyclic isothermal test results in a relatively long exposure of the specimen at temperature and provides an assessment of the oxidation resistance and diffusional stability of the coatings. By contrast, multitemperature burner rig tests use shorter duration cycles to simulate the thermal cycling during a typical aircraft gas turbine engine operating cycle with time at maximum temperature (to simulate takeoff) and time at intermediate temperature (to simulate cruising), followed by cooling.

The cycle chosen for this test was 3 minutes at 2100° F., 3 minutes at 1800° F., followed by 2 minutes of forced air cooling. Thus, the 500 hour duration multitemperature burner rig tests resulted in about 3750 thermal cycles to evaluate the adherence and spalling characteristics of the coating, and also to observe the cyclicly reversed creep or rippling phenomenon.

Results of testing the various coating compositions in the cyclic isothermal burner rig test are reported in Table 2.

TABLE 2

| COATING | TIME TO VISIBLE SUBSTRATE OXIDATION, HRS/MIL | TIME TO FAILURE HRS/MIL | DEPTH OF SUBSTRATE AFFECTED ZONE, MILS |
|---|---|---|---|
| NiCrAlY | 220 | 246* | 3.64 |
| SCC 101 | 155 | 284 | 2.56 |
| SCC 102 | 160 | 184 | 4.04 |
| SCC 103 | 238 | 252* | 0.79 |
| SCC 104 | 90 | 175 | 1.77 |
| SCC 105 | 170 | 236 | 3.94 |
| SCC 106 | 165 | 217 | 1.97 |

*No failure. Test discontinued after about 500 hours. Reported number is for 500 hours.

Figure 4:
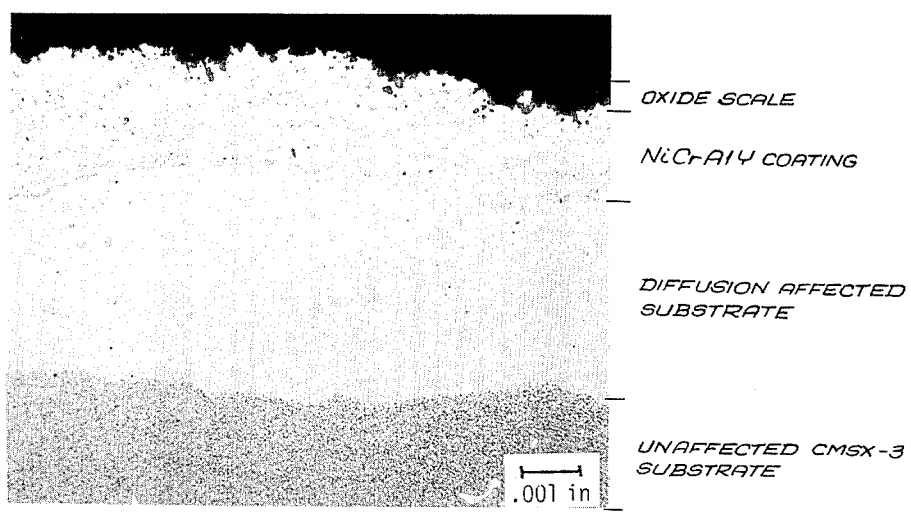
FIG. 4 is a sectional photomicrographic view of a NiCrAlY coated sample after 507 hours at 2100° F. in a cyclic isothermal burner rig test.
Figure 5:
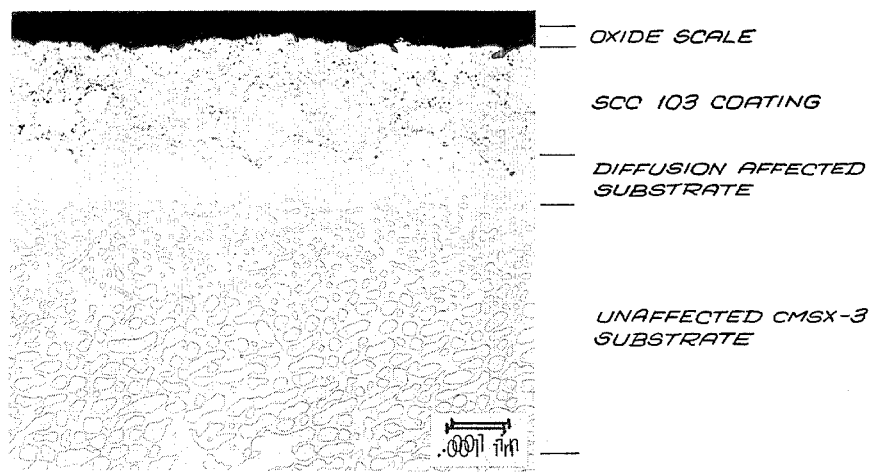
FIG. 5 is a sectional photomicrographic view of an SCC 103 coated sample after 491.3 hours at 2100° F. in a cyclic isothermal burner rig test.

Table 2 reports the time to visible substrate oxidation determined microscopically in hours per mil (1 mil=0.001 inches) to normalize the data for variations in the initial thickness of the coating. The time to failure of the coating is similarly normalized The final column of Table 2 reports the depth of the zone in the substrate which is affected by diffusional instability induced by interdiffusion of elements between the coating and the substrate. All of the coatings tested exhibited acceptable oxidation resistance, with some improvement observed for the coatings having the preferred compositions of the invention. Coating SCC 103 exhibited the best combination of oxidation resistance and diffusional stability of the coatings tested. FIGS. 4 and 5 show the microstructures of the NiCrAlY comparison material and the SCC 103 coated substrates, respectively, after completion of the tests. The SCC 103 alloy exhibits a significantly narrower diffusion affected substrate zone as compared with NiCrAlY.

Table 3 presents results of the cyclic multitemperature burner rig testing, including the time to visible rippling, the time to visible substrate oxidation and time to failure.

TABLE 3

| COATING | TIME TO VISIBLE RIPPLING | | TIME TO VISIBLE SUBSTRATE OXIDATION | | TIME TO FAILURE | |
|---|---|---|---|---|---|---|
| | HRS AT 2100 F/MIL | TOTAL CYCLES | HRS AT 2100 F/MIL | TOTAL CYCLES | HRS AT 2100 F/MIL | TOTAL CYCLES |
| NiCrAlY. | 26 | 1804 | 44 | 3053 | 54 | 3748 |
| SCC 101 | 32 | 820 | 78 | 1999 | 96 | 2460 |
| SCC 102 | 30 | 1281 | 65* | 2775* | 65* | 2775* |
| SCC 103 | 85 | 3319 | 96** | 3748* | 96** | 3748** |
| SCC 104 | 15 | 755 | 75** | 3773* | 75** | 3773** |
| SCC 105 | 15 | 618 | 85 | 3501 | 91** | 3748** |
| SCC 106 | 26 | 1196 | 75 | 3451 | 82** | 3773** |

*No failure, test discontinued after 328 hours of total test time which included 123 hours at 2100° F.
**No failure, test discontinued after about 500 hours of total test time which included 187 hours at 2100° F.

The compositions in accordance with the present invention all provided improved oxidation protection compared with the prior art NiCrAlY coating. Once again, the most preferred composition of the present invention, SCC 103, exhibits the best results.

Figure 6:
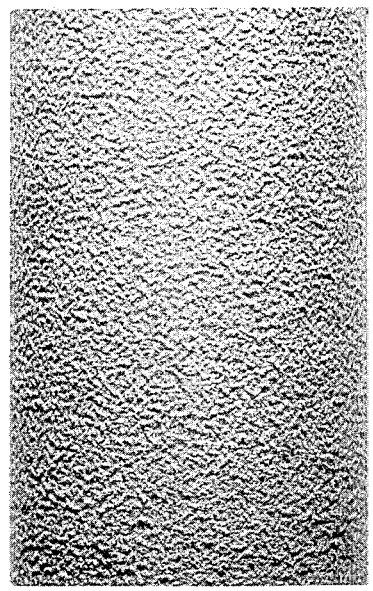
FIG. 6 is a surface photomicrograph of a NiCrAlY coated sample cycled 3,748 times in a multitemperature burner rig test.
Figure 7:
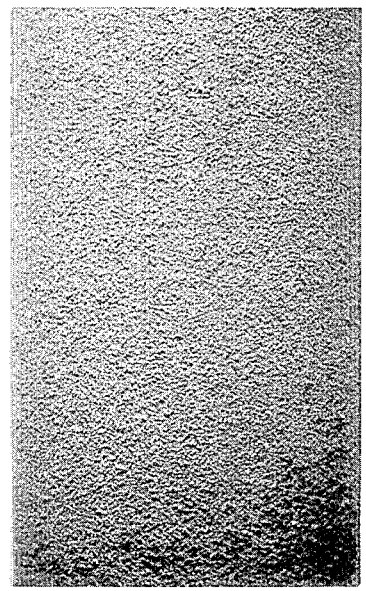
FIG. 7 is a surface photomicrograph of an SCC 103 coated sample cycled 3,748 times in a multitemperature burner rig test.

The improved resistance to surface rippling of the SCC 103 coating as compared with the prior NiCrAlY coating can be seen by comparing FIGS. 6 and 7. The surface of the substrate coated with NiCrAlY is substantially more rippled than that of the substrate coated with SCC 103.

It will now be appreciated that, through use of this invention, an improved coating material for superalloy turbine components is provided. The coatings of the invention are particularly advantageous when applied to single crystal turbine components, for which the coating is specifically tailored, but significant advantages are provided for other superalloy gas turbine component substrate materials. Although particular embodiments of the invention have been described in detail for purposes of illustration, various modifications may be made without departing from the spirit and scope of the invention. Accordingly, the invention is not to be limited except as by the appended claims.

We claim:

1. A composition of a coating for protecting a component of a gas turbine from damage at elevated temperatures, consisting essentially of an alloy of ingredients in about the following weight percentages:

| | |
|---|---|
| chromium | 15-35 |
| aluminum | 8-20 |
| tantalum | 1-10 |
| tantalum + niobium | 1-10 |
| silicon | 0.1-1.5 |
| hafnium | 0.1-1.5 |
| yttrium | 0-1 |
| cobalt | 0-10 |
| nickel | balance totalling 100 percent |

2. The composition of claim 1, wherein the ingredients are present in about the following amounts:

| | |
|---|---|
| chromium | 17-23 |
| aluminum | 10-13 |
| tantalum + niobium | 3-8 |
| silicon | 0.1-1.5 |
| hafnium | 0.1-1.5 |
| yttrium | 0-0.8 |
| cobalt | 0-trace |
| nickel | balance totalling 100 percent |

3. The composition of claim 1, wherein the ingredients are present in about the following amounts:

| | |
|---|---|
| chromium | 20 |
| aluminum | 11 |
| tantalum + niobium | 7 |
| silicon | 0.1-1.5 |

-continued

| | |
|---|---|
| hafnium | 0.1–1.5 |
| yttrium | 0–0.8 |
| cobalt | 0–trace |
| nickel | balance totalling 100 percent |

4. The composition of claim 1, wherein the ingredients are present in about the following amounts:

| | |
|---|---|
| chromium | 20 |
| aluminum | 11 |
| tantalum | 7 |
| niobium | 0–trace |
| hafnium | 1 |
| silicon | 1 |
| yttrium | 0–trace |
| cobalt | 0–trace |
| nickel | balance totalling 100 percent |

5. The composition of claim 1, wherein the coating is present on the surface of a turbine component substrate and further contains minor amounts of elements normally present in the substrate which enter the coating during exposure at elevated temperatures, and wherein some ingredients initially present in the coating are depleted after diffusion.

6. A coated component for use in a gas turbine engine, comprising:
   a substrate; and
   a coating on said substrate, said coating consisting essentially of an alloy of ingredients in about the following weight percentages:

| | |
|---|---|
| chromium | 15–35 |
| aluminum | 8–20 |
| tantalum | 1–10 |
| tantalum + niobium | 1–10 |
| silicon | 0.1–1.5 |
| hafnium | 0.1–1.5 |
| yttrium | 0–1 |
| cobalt | 0–10 |
| nickel | balance totalling 100 percent |

7. The component of claim 6, wherein the ingredients are present in about the following amounts:

| | |
|---|---|
| chromium | 17–23 |
| aluminum | 10–13 |
| tantalum + niobium | 3–8 |
| silicon | 0.1–1.5 |
| hafnium | 0.1–1.5 |
| yttrium | 0–0.8 |
| cobalt | 0–trace |
| nickel | balance totalling 100 percent |

8. The component of claim 6, wherein the ingredients are present in about the following amounts:

| | |
|---|---|
| chromium | 20 |
| aluminum | 11 |
| tantalum + niobium | 7 |
| silicon | 0.1–1.5 |
| hafnium | 0.1–1.5 |
| yttrium | 0–0.8 |
| cobalt | 0–trace |
| nickel | balance totalling 100 percent |

9. The component of claim 6, wherein the ingredients are present in about the following amounts:

| | |
|---|---|
| chromium | 20 |
| aluminum | 11 |
| tantalum | 7 |
| niobium | 0–trace |
| hafnium | 1 |
| silicon | 1 |
| yttrium | 0–trace |
| cobalt | 0–trace |
| nickel | balance totalling 100 percent |

10. The component of claim 6, wherein said substrate is formed to a shape selected from the group consisting of a turbine blade and a turbine vane.

11. The component of claim 6, wherein said substrate is of a single crystal alloy material.

12. The component of claim 6, wherein the coating further contains minor amounts of elements normally present in the substrate which have entered the coating during exposure at elevated temperature, and wherein some elements initially present in the coating are depleted after diffusion.

13. A process for protecting a gas turbine component from the adverse effects of elevated temperature operation, comprising the steps of:
   furnishing a coating starting material; and
   applying the coating starting material to the surface of the component so that the composition of the coating in place on the component is an alloy consisting essentially of the following weight percentages of ingredients:

| | |
|---|---|
| chromium | 15–35 |
| aluminum | 8–20 |
| tantalum | 1–10 |
| tantalum + niobium | 1–10 |
| silicon | 0.1–1.5 |
| hafnium | 0.1–1.5 |
| yttrium | 0–1 |
| cobalt | 0–10 |
| nickel | balance totalling 100 percent |

14. The process of claim 13, wherein said step of applying is performed by an overlay method.

15. The process of claim 13, wherein said step of applying is performed by a method selected from the group consisting of plasma spraying, electron beam physical vapor deposition, and sputtering.

16. The process of claim 13, wherein the coating starting material is an alloy consisting essentially of the following weight percentages of ingredients:

| | |
|---|---|
| chromium | 15–35 |
| aluminum | 8–20 |
| tantalum + niobium | 1–10 |
| silicon | 0.1–1.5 |
| hafnium | 0.1–1.5 |
| yttrium | 0–0.8 |
| cobalt | 0–10 |
| nickel | balance totalling 100 percent |

17. The process of claim 13, wherein the ingredients are present in about the following amounts:

| | |
|---|---|
| chromium | 20 |

-continued

|  |  |
|---|---|
| aluminum | 11 |
| tantalum + niobium | 7 |
| silicon | 0.1–1.5 |
| hafnium | 0.1–1.5 |
| yttrium | 0–0.8 |
| cobalt | 0–trace |
| nickel | balance totalling 100 percent |

18. The process of claim 13, wherein the ingredients are present in about the following amounts:

|  |  |
|---|---|
| chromium | 20 |
| aluminum | 11 |
| tantalum + niobium | 7 |
| silicon | 0.1–1.5 |
| hafnium | 0.1–1.5 |
| yttrium | 0–0.8 |
| cobalt | 0–trace |
| nickel | balance totalling 100 percent |

19. A component prepared in accordance with claim 13.

20. The process of claim 13, wherein the coating starting material has substantially the same composition as the coating in place on the component.

21. The process of claim 13, including the additional step of exposing the coated components to elevated temperature so that the chemical composition of the coating is altered by diffusion.

22. A component prepared in accordance with claim 21.

* * * * *

UNITED STATES PATENT AND TRADEMARK OFFICE
CERTIFICATE OF CORRECTION

PATENT NO. : 4,743,514
DATED : May 10, 1988
INVENTOR(S) : Thomas E. Strangman, Steven J. Vonk It is certified that error appears in the above-identified patent and that said Letters Patent is hereby corrected as shown below:

In Claim 18, column 13, line 18 delete "+ niobium"; line 19 delete "0.1-1.5" and substitute --1--; line 20 add --niobium  0-trace--; column 14, line 2 delete "0.1-1.5" and substitute --1--; and line 3 delete "0-0.8" and substitute --trace--.

Signed and Sealed this

Twelfth Day of May, 1992

Attest:

DOUGLAS B. COMER

Attesting Officer

Acting Commissioner of Patents and Trademarks